Dec. 12, 1967 K. H. REISSMUELLER ET AL 3,357,091

DEVICE FOR ALIGNING TWO OBJECTS AND FOR MOUNTING ONE TO THE OTHER

Filed July 21, 1965 3 Sheets-Sheet 1

INVENTORS.
RUDOLF F. ZURCHER,
KARL H. REISSMUELLER,
MANFRED W. REISSMUELLER,
BY Wester R. Thiel
ATTORNEY.

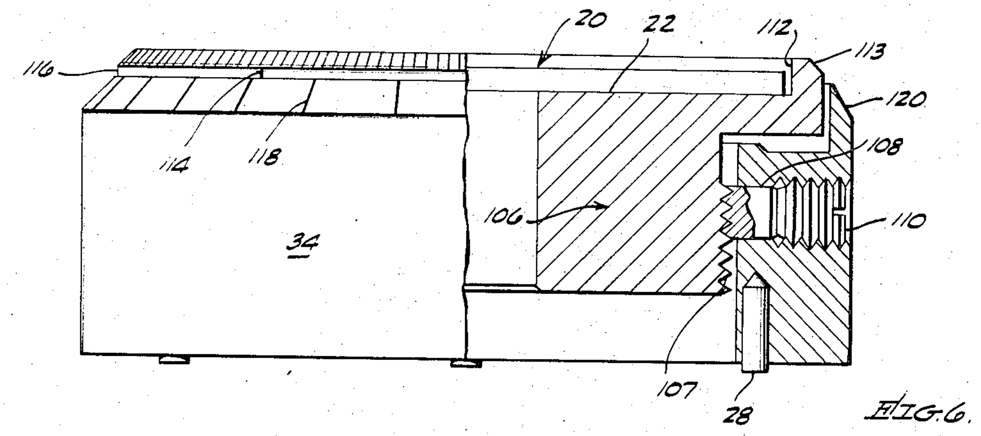
FIG. 6.
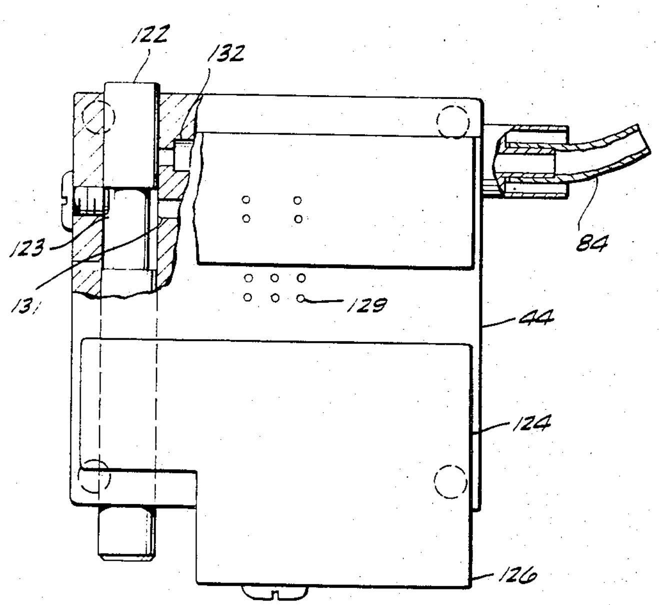
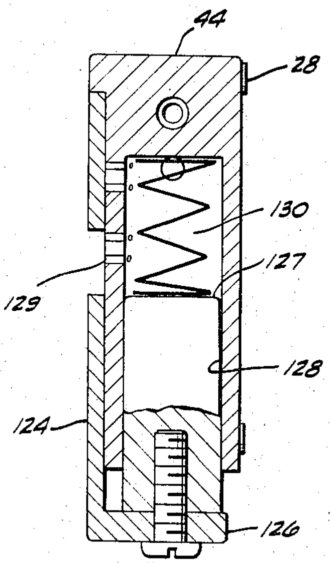
FIG. 8.
FIG. 7.
INVENTORS.
RUDOLF F. ZURCHER,
KARL H. REISSMUELLER,
MANFRED W. REISSMUELLER,
BY Walter R. Thiel
ATTORNEY.

United States Patent Office 3,357,091
Patented Dec. 12, 1967

3,357,091
DEVICE FOR ALIGNING TWO OBJECTS AND FOR MOUNTING ONE TO THE OTHER

Karl H. Reissmueller, Tustin, Rudolf F. Zurcher, Newport Beach, and Manfred W. Reissmueller, Costa Mesa, Calif., assignors to Hughes Aircraft Company, Culver City, Calif., a corporation of Delaware
Filed July 21, 1965, Ser. No. 473,610
8 Claims. (Cl. 29—470)

This invention relates to a device for aligning two objects, each having on one flat side a two or three-dimensional pattern in such a manner that the patterns are brought into contact in a predetermined relationship. More particularly, the invention relates to a simple optical mechanical mechanism for aligning separately a flat semiconductor device and a substrate to the same reference and transferring them into contact with each other so that certain patterns on each object are positioned in a predetermined relationship to enable bonding of the semiconductor device to the substrate in a precise orientation.

In the manufacture of microcircuit networks and single semiconductor devices, it is common practice to place small active or passive semiconductor devices, generally referred to in the electronic industry as flip-chips, having at least one small connector bump on one side thereof downwardly on the appropriate leads or other electrical conductor of a metallic thin film circuit substrate and to bond or affix the device and substrate together with one of several known methods. Because of the small size of these semiconductor devices, considerable difficulty has been encountered in accurately aligning them with the substrate leads.

To achieve this alignment, many methods have been developed by the industry. One such method utilizes a purely mechanical device to orient the flip-chips and the substrate and a vacuum arm transfer mechanism to position the flip-chip in contact with the substrate. Another method utilizes a pair of microscopes to accurately position the flip-chip and the substrate and a vacuum transfer arm to pick up the flip-chip and rotate it 180° into contact with the substrate. Both of these methods are extremely complicated and propose difficult alignment and maintenance problems, thus making them generally unsuitable for high production mounting of flip-chips.

Several other alignment methods have also been utilized in the industry but each of these requires that the substrate have a specific property such as transparency or a reflective surface so that alignment of the flip-chips can be achieved by either positioning the substrate on a second surface mirror or using the mirror surface of the substrate directly. While both of these methods have proven satisfactory under limited conditions, they have been found to be unsatisfactory when it is necessary to mount the flip-chip to opaque substrates.

In the alignment mechanism of the present invention, the pattern on the surface of the flip-chip and on the substrate are each aligned separately to the same intermediate reference such as a reticle built into a single microscope without changing the focal length during each alignment. One part is aligned from underneath and the other part is aligned from above to this reference reticle pattern. This "under and over alignment" is achieved with the help of a second surface mirror shifted in or out and inclined to the optical path of the microscope in a predetermined manner and geometrical relationship so that the spatial separated focal alignment points are always laying in a line vertical to the mirror surface, independent of the mirror thickness, the refractive index of the mirror or the angle of inclination of the microscope.

Therefore, it is an object of the present invention to provide an improved optical aligning mechanism for precisely positioning a first object in a predetermined relationship with a second object.

It is a further object of this invention to provide an improved optical aligning mechanism for precisely positioning a pattern on a first object in a predetermined relationship with a pattern on a second object which is relatively inexpensive and simple to operate by a single operator.

It is another object of this invention to provide an improved aligning mechanism for aligning two objects to the same reference independent of surface conditions of the objects so that these objects may be brought into precise predetermined relative position.

A still further object is to provide an improved flip-chip mounting device which utilizes a simple aligning and positioning mechanism for aligning the flip-chips and substrate.

A still further object of the present invention is to provide an improved device for bonding a flip-chip to a substrate in a predetermined fashion.

A still further object of the present invention is to provide an improved method for precisely positioning a pattern on a first object in a predetermined relationship with a pattern on a second object.

Another object of the present invention is to provide an improved method for bonding a flip-chip to a substrate in a predetermined fashion.

The present invention relates to a unique mechanism for aligning two objects each containing a pattern so that the patterns are brought into a predetermined orientation and the incorporation of this mechanism into a device for bonding small semiconductor elements called flip-chips to electric circuit substrates. Briefly, the novel alignment mechanism includes a movable slide block for supporting the flip-chip and a flat transparent plate movably supported by the movable slide and having parallel first and second surfaces. The flip-chip is supported by the first surface and the second surface has a reflective coating which is reflective in the direction of said first surface. A microscope including a reticle is rigidly positioned relative to said movable slide so that its principal axis is inclined to said first surface and is constructed to focus the reticle on said first surface. After the initial focusing of the microscope, the flip-chip is moved into the field of view of the said microscope and the pattern thereon is aligned with the reticle. A movable pickup member is rigidly positioned in juxtaposition to the flip-chip for moving it away from the first surface in a plane substantially perpendicular to said surface after the alignment of the pattern with the reticle. A holding fixture for the substrate is also movably supported by the movable slide block with the pattern thereon in a plane parallel to said first surface and passing through the principal focus of the microscope. The holding fixture is moved to bring the substrate into the field of view of said microscope and the pattern thereon into alignment with said reticle in a predetermined orientation after said flip-chip is picked up by the pickup member. Thereafter, movement of the pickup member and flip-chip toward said substrate brings the pattern on the flip-chip into a predetermined orientation with the pattern on the substrate.

To incorporate this alignment mechanism into a device for bonding together the two objects a preferred method is discussed herein. In this method a vacuum source is coupled to the pickup member to provide a vacuum pickup of the flip-chip and the pickup member serves as the nozzle or probe of an ultrasonic welder. In this fashion, when the two objects are brought into contact, an actuation of the ultrasonic power supply provides the energy directly to the flip-chip and substrate to bond them together.

Other advantages of the invention will hereinafter become more fully apparent from the following description of the drawings which illustrate a preferred embodiment thereof and in which:

FIG. 6 is a side elevational view partly in section showing the mirror holding block of the preferred embodiment shown in FIG. 1;

FIG. 7 is a top elevational view of the substrate holding fixture of the preferred embodiment shown in FIG. 1, and is partly cut away to more clearly illustrate the control valve incorporated therein; and FIG. 8 is a side elevational view shown in section of the substrate holding fixture of FIG. 7.

Figure 3:
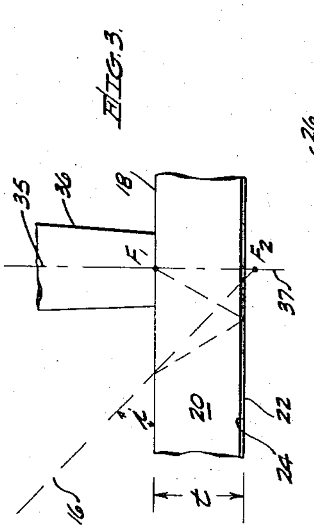
FIG. 3 is an enlarged view of the portion of FIG. 2 marked with the arrow 3—3 illustrating the optical focusing principle of the improved aligning mechanism.
Figure 2:
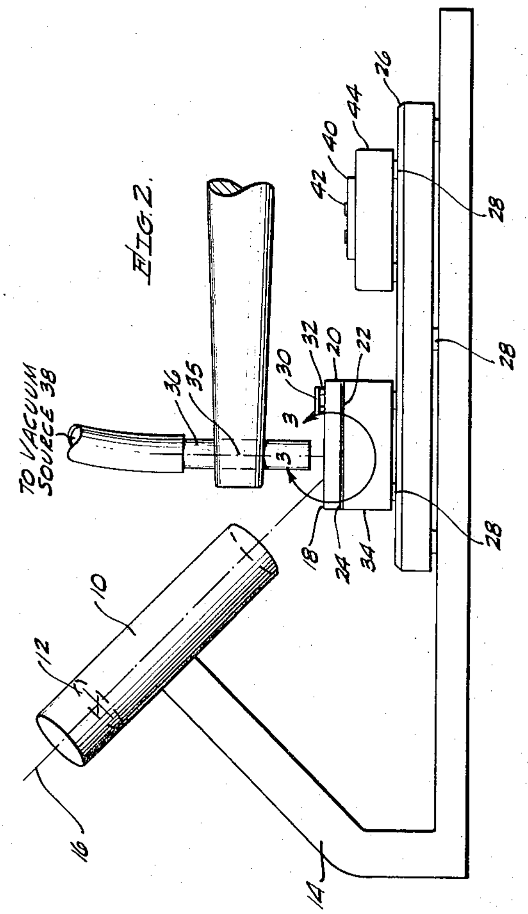
FIG. 2 is a schematic drawing shown in side elevation illustrating the primary elements of the improved alignment mechanism.

Referring now to FIGS. 2 and 3, the novel aligning device of the present invention includes a single microscope 10 which is any standard commercial microscope with a working distance of at least one inch or more and including a reticle 12 or cross hair. The microscope is fixed to a rigid base 14 or support with its principal axis 16 inclined to a first surface 18 of a transparent plate 20. A second surface 22 of the plate 20 is parallel to the first surface 18 and is coated with a conventional reflective material 24 so that the plate 20 acts as a second surface mirror reflective in the direction of the first surface 18. While it is preferred to construct the mirror material 24 and plate 20 in a single unit; that is, by coating the second surface 22 with the material 24, it should be understood that within the scope of this invention, the plate 20 and mirror may be separate items and merely formed into a unit by placing the plate on top of the mirror. By adjusting the focal length of the microscope 10, the reticle 12 is brought into focus at an apparent focus $F_1$ on the first surface 18 of the plate 20 and the plate 20 is moved until the reticle 12 is aligned with the center axis 35 of a pickup device 36. This center axis 35 is now co-linear with a line 37 passing through the apparent focus $F_1$ and the principal focus $F_2$ of the microscope. The plate 20 is supported by a movable slide block or platform 26 which has surfaces parallel to those of the plate 20 and is freely movable in an X–Y geometry because of a plurality of small Teflon feet 28 engaging the rigid base 14. A part or object 30 such as a flip-chip with a pattern 32 on one side is laying directly on the first surface 18 of the plate.

The next step in the alignment process once the reticle 12 is focused is to move the flip-chip 30 in the X–Y plane until the pattern 32 is aligned with the reference pattern of the reticle 12. This may be done either by moving the flip-chip 30 only or by moving the plate 20 together with the flip-chip 32. The plate 20 is typically retained in a holding block 34 which has a plurality of Teflon feet 28 engaging the block 26. This optical alignment is made from underneath the flip-chip by use of the reflective surface 24.

Once the flip-chip 30 is aligned with the reticle it is picked up or removed vertically from in contact with the first surface 18 by the pickup device 36 which may be any conventional pickup device such as a vacuum probe or nozzle coupled to a vacuum source 38 without disturbing the alignment.

Without changing the focal length of the microscope 10 a second part 40 such as an electric circuit substrate having a specific pattern 42 of leads or other electrical conductors on one surface rigidly held in a suitable holding fixture 44 is now brought into the field of view of the microscope 10. The holding fixture 44 is supported by the slide block on a plurality of Teflon feet 28 and is of a construction to rigidly maintain the surface of the substrate 40 parallel to the first surface 18 of the plate 20 but at an elevation relative thereto corresponding to the principal focal point $F_2$ of the microscope 10. The pattern 42 of the leads is now aligned to the reference reticle 12 of the microscope 10 reticle by moving or sliding the holding fixture 44 in the X–Y plane. The optical alignment of the leads is made from above through the air. The first part still on the pickup vacuum probe is now lowered vertically on to the second part, thus bringing the connector bumps 32 and substrate leads 42 into contact in a predetermined orientation. The first part may now be released by the pickup probe 36 or, as discussed in the preferred embodiment of the invention, held in position for a suitable bonding operation.

From optical theory, as clearly illustrated in FIG. 3, when a parallel plate 20 having a second surface mirror 24 with a reflective coating so that a light beam is reflected towards the opposite surface is viewed by an inclined microscope 10, the principal focus $F_2$ of the microscope 10 and the apparent focus $F_1$ of the microscope 10 with the plate and mirror in its field of view lie along a line 37 which is normal to the surface of the plate 20 and this is independent of the degrees of arc of the angle of inclination $i$ of the principal axis of the microscope 10 relative to the surface 18 of the plate 20, the thickness $t$ and refractive index of the parallel plate 20. This principle forms the basis for the novel alignment mechanism of the present invention, since it is relatively simple to mechanize and achieve the desired alignment.

Figure 1:
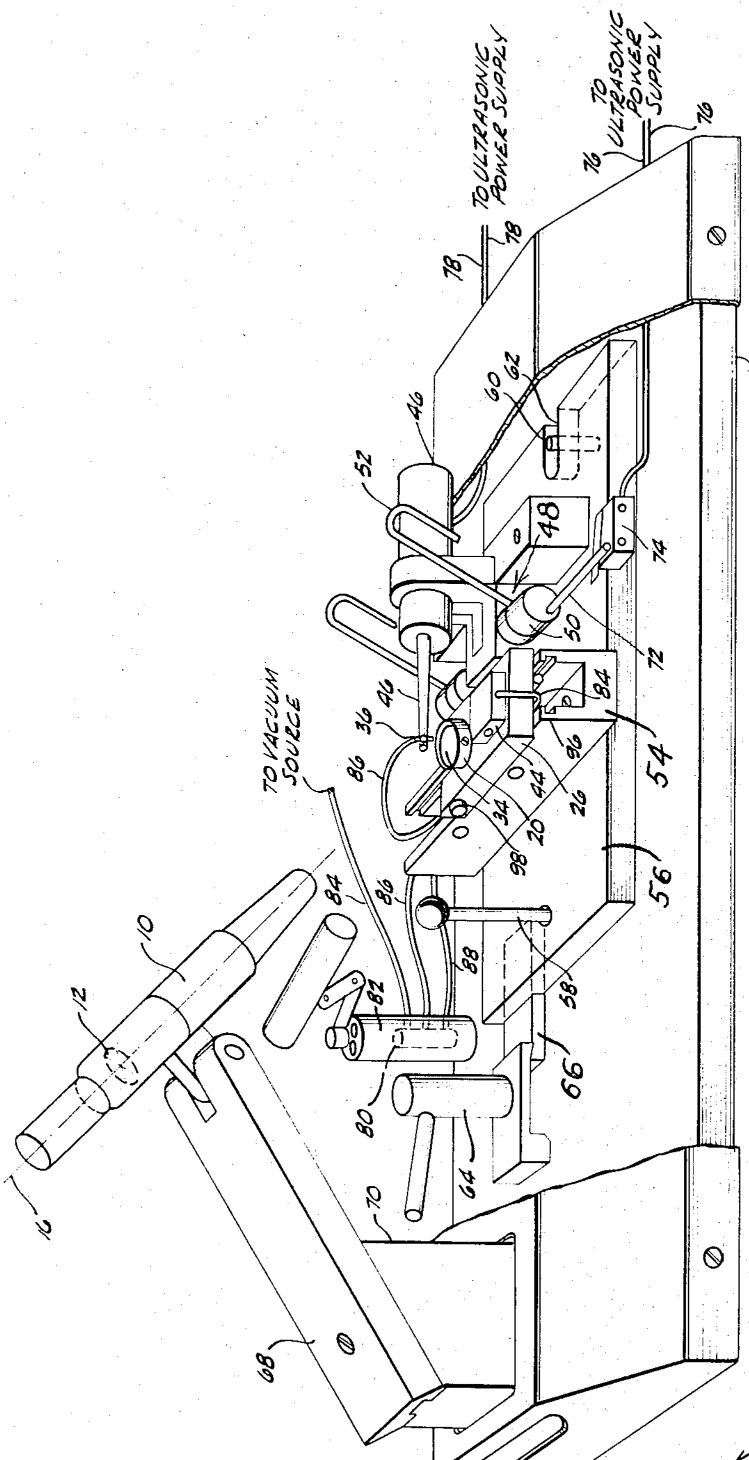
FIGURE 1 is a perspective view of a preferred embodiment of a device for bonding a flip-chip to a substrate and is partly cut away to illustrate the incorporation of the improved alignment mechanism therein.

In the preferred embodiment of the present invention as illustrated in FIG. 1 the pickup vacuum probe or quill 36 is affixed to the shank of a conventional ultrasonic weld head assembly 46 with a built-in lowering and lifting mechanism 48 illustrated as elongated cam shafts 50 having operating levers 52. The vacuum pickup probe 36 is typically cylindrical in shape and has an outside diameter the same as or slightly greater than the length of a flip-chip 30. The movable slide block 26 is carried on a U-shaped linear slide base 54. The ultrasonic weld head assembly 46 and the U-shaped linear slide base 54 are fastened to a platform or plate 56 which is supported on small area Teflon feet (not shown) and is movable in the X–Y plane by a conventional joy stick mechanism (not shown) having an operating lever 58. The platform 56 is held to the main base 14 by a conventional screw and sliding spring arrangement (not shown). The joy stick plate is guided on one end by a pin 60 affixed to the base 14 and engaging a slot 62 in the plate and on the other end by the joy stick mechanism.

The platform 56 is clamped in place relative to the main base 14 by a conventional screw clamp mechanism 64 engaging a coupler plate 66 projecting from one end of the platform 56. The clamp mechanism 64 is affixed to the main base 14 to provide clamping of the platform 56 without distortion in the X–Y plane. The microscope 10 is screw fastened to a microscope adapter 68 and is longitudinally adjustable along the main device axis by a microscope stand 70.

An actuating pin 72 is affixed to one of the cam shafts 50 to actuate the bonding cycle by engagement with a limit switch 74 mounted to the platform 56 at the appropriate displacement of the shaft 50. The limit switch 74 is electrically coupled through conductors 76 to a conventional ultrasonic welding power supply (not shown) which is coupled through conductors 78 to the weld head 46 to deliver power thereto when rendered operative by the switch 74.

A standoff 80 is fastened to the base 14 and serves as an illuminator base to which may be mounted a standard commercially available microscope illuminator 82. In addition, in the preferred embodiment the standoff 80 serves as the vacuum manifold for the vacuum pickup probe 36 and vacuum holding fixture 44 and, therefore, has coupled to it a plurality of tubes 84, 86 and 88 which are coupled to a conventional vacuum source (not shown), the substrate holding fixture 44 and the vacuum pickup probe 36, respectively.

Figure 5:
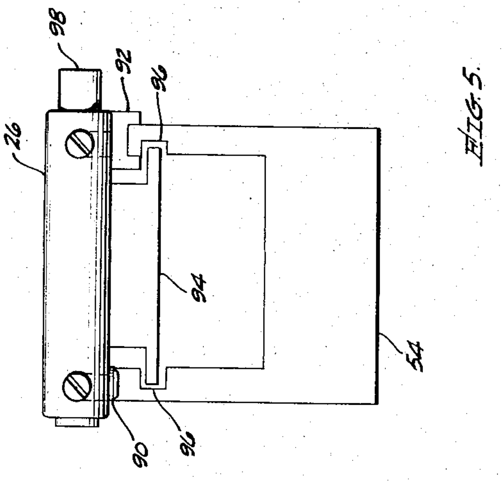
FIG. 5 is an end elevational view of the movable slide block of FIG. 4 including for clarity the slide base of FIG. 1.
Figure 4:
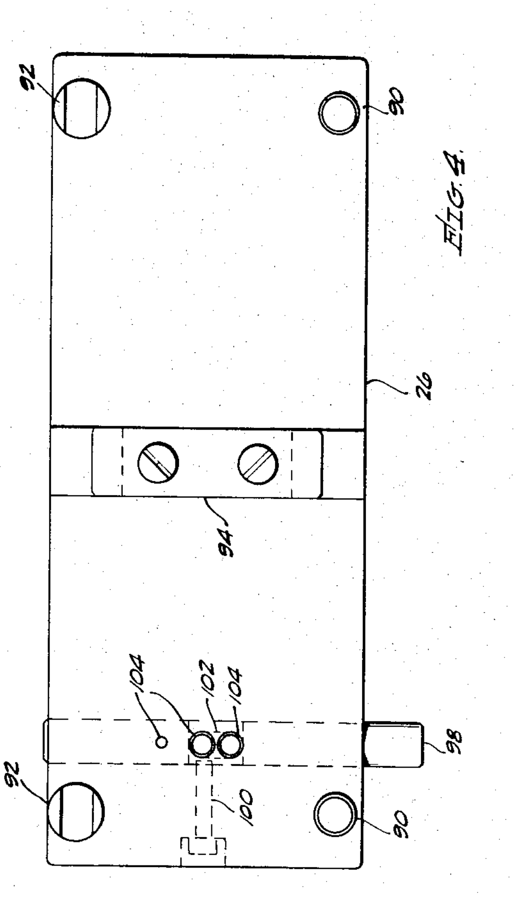
FIG. 4 is a bottom elevational view of the movable slide block shown in the preferred embodiment of FIG. 1.

Referring now to FIGS. 4 and 5, there is shown the movable slide block 26 of the preferred embodiment of FIG. 1. The block 26 includes two Teflon shoulder plug bearings 90 on one of the elongated sides and two U-shaped Teflon shoulder plug bearings 92 on the other elongated side. A T-shaped stop plate 94 is fastened underneath and retains the block 26 by engagement in two slots 96 in the U-shaped slide base 54. The stop plate 94 may also serve as a movement limiting device by including in the U-shaped slide base 54 two screws or pins (not shown) at locations sufficient to be engaged by the slide plate 26.

A sliding valve spool 98 is inserted into a bore in the slide block 26 and is retained therein by a screw 100 engaged in a valve section 102. Three unevenly spaced valve ports 104 extend into the valve section 102 and serve to control the vacuum at the vacuum pickup probe 36. This control is achieved by coupling one port to the vacuum pickup probe 36, the other port through the standoff 80 to the vacuum source and the third port serving as an exhaust. This control has been incorporated into the slide block 26 to facilitate finger operation by a single operator, since it is located in a convenient spot. The slide block 26 shown in the preferred embodiment may be used for substrates containing short leads; however, for substrates with long leads, an alternate embodiment of the block (not shown) containing a cutout or notch at one end so that the leads hang down through the block into the U-shaped base 54 may be used.

Referring to FIG. 6, there is shown the direct manual manipulated plate holding block 34 shown in the preferred embodiment of FIG. 1. This block includes a circular metallic main body 106 having a threaded portion 107, at least three protruding small area Teflon bearing feet 28 and at least three Teflon plugs 108 engaging the threaded portion 107. The plugs 108 are arranged evenly around the circumference of the main body 106 and each is backed up by a set screw 110. The use of the Teflon plugs 108 and set screws 110 eliminates machining and matching of internal threads and provides a smooth self braking action. The main body 106 retains in a protecting recess 112 the transparent plate 20 with the second surface mirror 22 in contact with the bottom of the recess 112. A top rim 113 of the main body is knurled for finger gripping to facilitate rotation of the body. For easy resetting of each spatial focal point distance when switching to and from work parts of different thicknesses, a vertical index marking 114 on a cylindrical top circumference 116 of the body is alignable with a plurality of marks 118 around a chamfered top surface 120.

FIGS. 7 and 8 show the substrate holding fixture 44 of the preferred embodiment of FIG. 1. This fixture incorporates an actuating valve spool 122 including a valve section 123, Teflon feet 28 and a clamping member 124. As best shown in FIG. 8 the clamping member 124 includes a flange portion 126 engageable with adjacent surfaces of the fixture and a spring load piston 127 extending through a base 128 into a central chamber 130. A plurality of small ports 129 extend from the chamber 130 to the surface of the fixture 44 adjacent to the end of the clamping member 126 and a larger port 131 extends from the chamber to the valve section 123. Coupled to a port 132 extending transversely of the fixture is the vacuum source tube 84 which is coupled through the standoff 80 (FIG. 1) to the vacuum source. Thus, by positioning the valve section 123 with the ports 131 and 132 opening into it, the vacuum source is coupled to the central chamber 130 causing the clamping member 124 to engage a part or substrate (not shown) positioned on the surface of the fixture 44 on top of the small ports, and the part is held in contact with the surface by the pressure differential existing between the opposite surfaces of the port at the small ports 129.

The movable slide block 26, the platform 56, the plate holding block 34 and the substrate holding fixture 44 have been described as each including a plurality of small Teflon feet 28 extending from one surface thereof. It is the function of these feet 28 to eliminate the necessity of either a wet and a dry lubricant between the bearing surfaces since Teflon has the unique property of lowering the coefficient of friction.

While a general embodiment of the alignment mechanism of this invention has been herein described and illustrated and one embodiment of the incorporation of the mechanism into a specific device has also been discussed and illustrated, it should be appreciated by those skilled in the art that variations of the disclosed arrangement both as to its details and the operation of such details may be made without departing from the skill and scope thereof. Accordingly, it is intended that the foregoing disclosure and the showings made in the drawings may be considered as illustrative of this invention and not construed in a limited sense.

What is claimed is:

1. Device for aligning a pattern on a first object with a pattern on a second object, comprising:
   - a movable platform;
   - a flat transparent plate movably supported by said platform and having parallel first and second surfaces, said first object being supported by said first surface with its pattern visible to said first surface and said second surface having a reflective coating;
   - a microscope including a reticle rigidly positioned relative to said platform and having a principal axis inclined to said first surface, said microscope being adapted to focus said reticle on said first surface by reflection from said reffection coating so that when said first object is moved into the field of view of said microscope the pattern thereon may be aligned with said reticle;
   - movable pickup means rigidly juxtaposed to said first object for moving said first object away from said first surface in a line substantially perpendicular to said first surface after alignment of the pattern on said first object with said reticle; and
   - said second object being supported by said movable platform with the pattern thereon in a plane parallel to said first surface and passing through the principal focus of said microscope, said platform being movable to bring said second object into the field of view of said microscope after said first object is picked up by said pickup means, whereby said second object is moved to bring said second pattern into alignment with said reticle in a predetermined orientation, whereafter subsequent movement of said pickup means towards said second object will bring the pattern on said first object into a predetermined orientation with the pattern on said second object.

2. Device for aligning a pattern on a first object with a pattern on a second object, comprising:
   - a movable platform;
   - a flat transparent plate movably supported by said platform and having parallel first and second surfaces, said first object being supported by said first surface with its pattern visible to said first surface and said second surface having a reflective coating, said coating being reflective in the direction of said first surface;
   - a microscope including a reticle rigidly positioned relative to said platform and having a principal axis inclined to said first surface, said microscope being adapted to focus said reticle on said first surface by reflection from said reflective coating so that when said first object is moved into the field of view of said microscope the pattern thereon may be aligned with said reticle;

movable pickup means rigidly juxtaposed to said first object for moving said first object away from said first surface in a line substantially perpendicular to said first surface after alignment of the pattern on said first object with said reticle; and holding means for holding said second object, said holding means being movable with said platform and relative to said platform and supporting said second object with the pattern on said second object in a plane parallel to said first surface and passing through the principal focus of said microscope, said platform being moved to bring said second object into the field of view of said microscope after said first object is picked up by said pickup means, whereby said holding means is moved to bring said second pattern into alignment with said reticle in a predetermined orientation, whereafter subsequent movement of said pickup means towards said second object will bring the pattern on said first object into a predetermined orientation with the pattern on said second object.

3. Device for aligning a pattern on a first object with a pattern on a second object and for bonding one to the other, comprising:

a movable platform;

a flat transparent plate movably supported by said platform and having parallel first and second surfaces, said first object being supported by said first surface with its pattern visible to said first surface and said second surface having a reflective coating;

a microscope including a reticle rigidly positioned relative to said platform and having a principal axis inclined to said first surface, said microscope being adapted to focus said reticle on said first surface by reflection from said reflective coating so that when said first object is moved into the field of view of said microscope the pattern thereon may be aligned with said reticle;

movable pickup means rigidly juxtaposed to said first object for moving said first object away from said first surface in a line substantially perpendicular to said first surface after alignment of the pattern on said first object with said reticle;

holding means movably supported by said platform, said second object being supported by said holding means with the pattern thereon in a plane parallel to said first surface and passing through the principal focus of said microscope, said platform being moved to bring said second object into the field of view of said microscope after said first object is picked up by said pickup means, whereafter said holding means is moved to bring said second pattern into alignment with said reticle in a predetermined orientation, means for moving said pickup means towards said second object to bring the pattern on said first object into a predetermined orientation with the pattern on said second object; and means cooperating with said pickup means for rigidly bonding one of said objects to the other object.

4. Device for aligning a pattern on a first object with a pattern on a second object and for bonding one to the other, comprising:

a movable platform;

a flat transparent plate movably supported by said platform and having parallel first and second surfaces, said first object being supported by said first surface with its pattern visible to said first surface and said second surface having a reflective coating, said coating being reflective in the direction of said first surface;

a microscope including a reticle rigidly positioned relative to said platform and having a principal axis inclined to said first surface, said microscope being adapted to focus said reticle on said first surface by reflection from said reflective coating so that when said first object is moved into the field of view of said microscope the pattern thereon may be aligned with said reticle;

movable pickup means rigidly positioned in juxtaposition to said first object for moving said first object away from said first surface in a line substantially perpendicular to said first surface after alignment of the pattern on said first object with said reticle;

means for holding said second object, said means being movable with said platform and relative thereto and supporting said second object with the pattern on said second object in a plane parallel to said first surface and passing through the principal focus of said microscope, said platform being moved to bring said second object into the field of view of said microscope after said first object is picked up by said pickup means, whereafter said holding means is moved to bring said second pattern into alignment with said reticle in a predetermined orientation, means for moving said pickup means towards said second object to bring the pattern on said first object into a predetermined orientation with the pattern on said second object; and means cooperating with said pickup means for rigidly bonding one of said objects to the other object.

5. Device for aligning the connector bumps on a flip-chip with the leads or other electrical conductors on a substrate and for bonding one to the other, comprising:

a rigid base;

a movable platform mounted on said base;

a flat transparent plate movably supported by said platform and having parallel first and second surfaces, said flip-chip being supported by said first surface with the connector bumps facing said first surface and said second surface having a reflective coating, said coating being reflective in the direction of said first surface;

a microscope including a reticle mounted on said rigid base and having a principal axis inclined to said first surface, said microscope being adapted to focus said reticle on said first surface by reflection from said reflective coating so that when said flip-chip is moved into the field of view of said microscope the connector bumps thereon may be aligned with said reticle;

a movable vacuum pickup probe rigidly positioned in juxtaposition to said flip-chip and having a vacuum source connected thereto which is rendered operative after alignment of the connector bumps with said reticle for moving said flip-chip away from said first surface in a plane substantially perpendicular to said first surface;

a holding fixture rigidly retaining said substrate, said fixture being movable with said platform and relative thereto and supporting said substrate with the leads on said substrate in a plane parallel to said first surface and passing through the principal focus of said microscope, said platform being moved to bring said substrate into the field of view of said microscope after said flip-chip is picked up by said vacuum pickup probe, whereafter said holding fixture is moved to bring said leads into alignment with said reticle in a predetermined orientation, means for moving said pickup probe towards said substrate to bring said connector bumps into a predetermined orientation with said leads; and an ultrasonic weld head supporting said vacuum pickup probe and having an ultrasonic power supply coupled thereto and adapted to supply energy to said weld head and pickup probe after alignment of said bumps and leads.

6. A method for aligning a pattern on a first object with a pattern on a second object, comprising:

positioning said first object on a plate having a second surface mirror and a plain surface spaced therefrom with the pattern in contact with the plain surface of the plate;

focusing the reticle of a microscope on the plain surface of the plate by reflection from said second surface;

aligning the pattern of said first object with the focused reticle;

moving said first object vertically from in contact with the plate;

moving said second object into the field of view of said microscope and positioning it with the pattern thereon in a plane passing through the principal focus of the microscope;

aligning the pattern on said second object with the reticle; and moving said first object into contact with said second object, whereby the patterns on said objects are brought into contact in a predetermined orientation.

7. A method for aligning a pattern on a first object with a pattern on a second object and for bonding one object to the other object, comprising:

positioning said first object on a plate having a second surface mirror and a plain surface spaced therefrom with the pattern in contact with the plain surface of the plate;

focusing the reticle of a microscope on the plain surface of the plate by reflection from said second surface;

aligning the pattern of said first object with the focused reticle;

moving said first object vertically from in contact with the plate;

moving said second object into the field of view of said microscope and positioning it with the pattern thereon in a plane passing through the principal focus of the microscope;

aligning the pattern on said second object with the reticle;

moving said first object into contact with said second object; and affixing one object to the other while they are held in contact, whereby said objects are bonded together in a predetermined orientation.

8. The method of aligning the connector bumps on a flip-chip with the leads of an electric circuit substrate and for bonding said flip-chips to said substrate, comprising:

positioning said flip-chip on a plate having a second surface mirror and a plain surface spaced therefrom with the connector bumps in contact with the plain surface of the plate;

focusing the reticle of a microscope on the plain surwith the connector bumps in contact with the plain surface of the plate;

aligning said connector bumps with the focused reticle;

moving said flip-chip vertically from in contact with the plate;

moving said substrate into the field of view of said microscope and positioning it with said leads thereon in a plane passing through the principal focus of the microscope and aligning the leads with the reticle;

moving said flip-chip into contact with said substrate; and bonding said flip-chip to said substrate while they are held in contact, whereby the flip-chip and substrate are bonded together in a predetermined orientation.

No references cited.

JOHN F. CAMPBELL, *Primary Examiner.*

M. L. FAIGUS, *Assistant Examiner.*

UNITED STATES PATENT OFFICE

CERTIFICATE OF CORRECTION

Patent No. 3,357,091 December 12, 1967

Karl H. Reissmueller et al.

It is hereby certified that error appears in the above numbered patent requiring correction and that the said Letters Patent should read as corrected below.

Column 5, line 65, for "load" read -- loaded --; column 6, line 41, for "reffection" read -- reflective --; column 10, lines 16 to 18, strike out "sur-with the connector bumps in contact with the plain surface of the plate;" and insert instead -- surface of the plate by reflection from said second surface; --.

Signed and sealed this 27th day of May 1969.

(SEAL)
Attest:

Edward M. Fletcher, Jr.
Attesting Officer

William E. Schuyler, Jr.
Commissioner of Patents